United States Patent [19]

Schaire

[11] Patent Number: 4,797,927

[45] Date of Patent: Jan. 10, 1989

[54] VOICE RECOGNITION PROCESS UTILIZING CONTENT ADDRESSABLE MEMORY

[75] Inventor: Scott Schaire, San Remo, N.Y.

[73] Assignee: Grumman Aerospace Corporation, Bethpage, N.Y.

[21] Appl. No.: 792,994

[22] Filed: Oct. 30, 1985

[51] Int. Cl.[4] .............................................. G10L 5/06
[52] U.S. Cl. ...................................... 381/42; 381/43; 364/513.5; 382/10
[58] Field of Search ....................... 382/10, 23, 25, 29; 381/41–50; 364/513, 513.5

[56] References Cited

U.S. PATENT DOCUMENTS

| | | |
|---|---|---|
| 3,147,343 | 9/1964 | Meyer et al. . |
| 3,204,030 | 8/1965 | Olson et al. . |
| 3,539,726 | 11/1970 | Bolie . |
| 3,582,559 | 6/1971 | Hitchcock . |
| 3,647,978 | 3/1972 | Hill . |
| 3,673,331 | 6/1972 | Hair et al. . |
| 3,755,627 | 8/1973 | Berkowitz et al. . |
| 3,770,892 | 11/1973 | Clapper . |
| 3,812,291 | 5/1974 | Brodes et al. . |
| 3,909,785 | 9/1975 | Howells . |
| 4,060,694 | 11/1977 | Suzuki et al. . |
| 4,087,630 | 5/1978 | Browning et al. . |
| 4,110,737 | 8/1978 | Fahey . |
| 4,156,868 | 5/1979 | Levinson . |
| 4,297,528 | 10/1981 | Beno . |
| 4,363,102 | 12/1982 | Holmgren et al. . |
| 4,383,135 | 5/1983 | Scott et al. . |
| 4,384,273 | 5/1983 | Ackland et al. . |
| 4,394,538 | 7/1983 | Warren et al. . |
| 4,423,291 | 12/1983 | Zwicker et al. . |
| 4,509,133 | 4/1985 | Monbaron et al. . |
| 4,541,115 | 9/1985 | Werth . |
| 4,618,984 | 10/1986 | Das et al. . |

FOREIGN PATENT DOCUMENTS

| | | |
|---|---|---|
| 0077194 | 4/1983 | European Pat. Off. . |
| 53-67320 | 6/1978 | Japan . |
| 56-63667 | 5/1981 | Japan . |
| 59-176836 | 10/1984 | Japan . |

Primary Examiner—Patrick R. Salce
Assistant Examiner—Emanuel T. Voeltz
Attorney, Agent, or Firm—Pollock, VandeSande & Priddy

[57] ABSTRACT

A voice recognition system digitizes sequentially spoken words forming a vocabulary. As each work is spoken during an initializing phase, its digital value forms a score which corresponds directly to an address in memory. During a later voice recognition phase, any word spoken is scored and the word is read from an indirectly addressed memory without the necessity of comparisons with the data stored in each memory location.

10 Claims, 2 Drawing Sheets

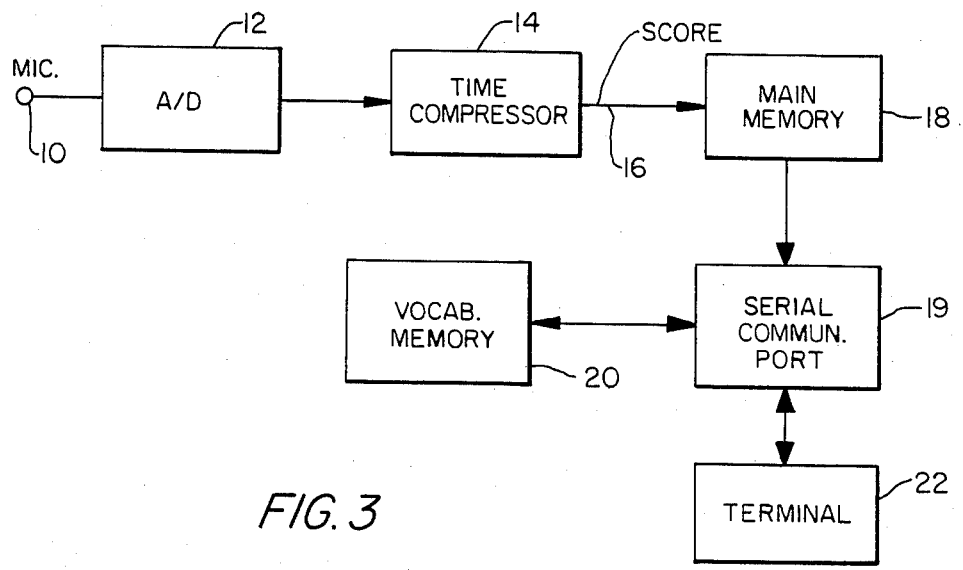

| MAIN MEMORY | | VOCAB. MEMORY | |
|---|---|---|---|
| ADDR. | DATA (VOCAB. POS.) | ADDR. (VOCAB. POS.) | DATA |
| SCORE 1 | 100 (NULL) | 1 | DOG |
| SCORE 2 | 2 | 2 | CAT |
| SCORE 3 | 2 | 3 | MOUSE |
| SCORE 4 | 1 | 4 | HOUSE |
| SCORE 5 | 3 | 5 | RUG |
| SCORE 6 | 1 | 6 | TREE |
FIG. 4
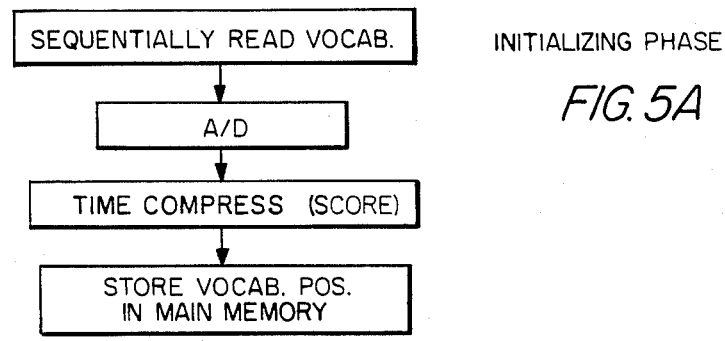
INITIALIZING PHASE
FIG. 5A
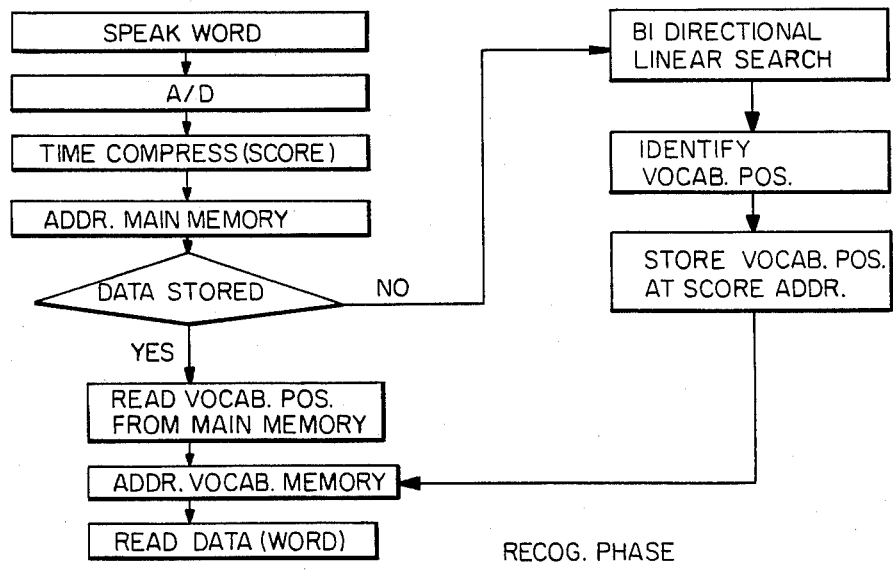
RECOG. PHASE
FIG. 5B

VOICE RECOGNITION PROCESS UTILIZING CONTENT ADDRESSABLE MEMORY

FIELD OF THE INVENTION

The present invention relates to voice recognition systems, and more particularly to a system utilizing a content addressable memory.

BACKGROUND OF THE INVENTION

The prior art includes a number of word recognition systems which digitize spoken words and develop scores for each digitized word. FIG. 1 illustrates a table which is helpful in explaining the concept of the prior art. During an initializing phase of the system, a series of words, for example "cat, dog, mouse," etc., is sequentially read into the system, as a preset vocabaulary list, where it becomes sequentially digitized as scores or values. Each of these words occupies a unique numerical position in a vocabulary list which corresponds to address locations in a memory. Thus, for example, the word "cat" is digitized to a value of score 1 which forms a data word located in a numerical address location corresponding to the position of the word "cat" in the preset vocabulary list. In normal operation, the scores are serially stored in memory as the words are spoken.

During a subsequent recognition stage of the system, if the word "cat" is spoken, in order for the system to recognize it, the system must digitize the spoken word and form a quantized score for it. Then, the entire memory must be searched for an identity with a score written into memory during the earlier initializing phase. Next, the correlation between the score and the word may be made since the address location of the word relates to its position in the present vocabulary. as will be appreciated, this is a time-consuming process which causes the voice recognition system utilizing the prior art method to operate slowly.

Several other major problems exist for the prior art systems. An initial problem is the response time which is a function of the size of the vocabulary.

A further disadvantage is due to the fact that different pronunciations of the same word may not be recognized.

A further disadvantage of the prior art is that a fixed filter accuracy is used for varying size vocabularies.

It should also be noted that the prior art disadvantageously requires words in a vocabulary to be at least a fixed hamming distance apart or else they will be erroneously recognized.

BRIEF DESCRIPTION OF THE PRESENT INVENTION

By comparison, FIG. 2 illustrates the concept of the present invention wherein the word "mouse" is spoken during an initializing phase and the quantized score derived therefrom (score 5) is loaded into address memory location five.

During a subsequent recognition phase, when the word "mouse" is again spoken, its score (5) will correspond to the fifth memory address location. Thus, there is no comparison made of the scores stored in all the memory locations, as done in the prior art. Rather, the present invention utilizes a content addressable memory for directly determining the memory address for each recognized word. Once the address has been determined, the actual word involved is found in an auxiliary vocabulary memory by relating the score to words in the preset vocabulary list that are stored during the initializing phase.

The present invention offers a technique wherein a word recognition memory is indexed by a varying bit score, rather than sequential addressing; therefore, word recognition is an immediate memory look-up, producing a much faster response time.

A further advantage of the present invention, which will be explained in greater detail hereinafter, relates to the fact that the present invention allows recognition systems to search adjacent address locations when a word is not immediately recognized thereby enabling the system to operate when several differences exist between spoken words during the initializing and subsequent recognition phases. Accordingly, the inventive method allows recognition systems to become better adjusted to their environment for a group of users.

A further advantage is that very large hamming distances may exist between different pronunciations of the same word.

The above-mentioned objects and advantages of the present invention will be more clearly understood when considered in conjunction with the accompanying drawings, in which:

BRIEF DESCRIPTION OF THE FIGURES

FIG. 1 is a tabulation of address versus data, explaining the concept of the prior art;

FIG. 2 is a tabulation of address versus data, explaining the concept of the present invention;

FIG. 3 is a block diagram of the present invention;

FIG. 4 is a tabulation of address and data relationships for a main memory and vocabulary memory as employed with the present invention;

FIG. 5A is a basic flow chart of the initializing phase of the present inventive method; and FIG. 5B is a basic flow chart of the recognition phase of the present inventive method.

DETAILED DESCRIPTION OF THE PRESENT INVENTION

Referring to the figures and more particularly FIG. 1 thereof, the concept of the prior art will be discussed in greater detail.

During a first phase of operation, namely an initializing phase, a series of words is read into the system; and each word is digitized. The resulting digital scores are stored in a series of addresses. By way of example, during a initializing phase the word "cat" is digitized; and a digital value or score is ascribed thereto. The score forms a data word which is stored in a location in memory. During a subsequent phase, namely a recognition phase when the word "cat" is spoken, a digital representation or score is again formed. In the example shown in FIG. 1, the score for the word "cat" is equal to a binary value of "1." In order to properly recognize the word "cat," the recognized score is compared against the data in each memory location and the comparison which gives the greatest similarity determines the recognized word. As will be appreciated, if the word spoken during a recognition phase is spoken quite differently than it was during an initializing phase, the word "cat" may be recognized with a different score; and subsequently, the system will erroneously recognize the word. Also, as will be recognized, the recognition process is relatively time consuming inasmuch as each address must be queried to determine the most favorable comparison between the score of each word stored during initializing and a word spoken during a recognition phase.

FIG. 2 indicates the concept of the present invention in greater detail. Unlike the prior art approach, the present invention determines the digital score of each word during an initializing process; and the score becomes the address. For example, at the completion of an initializing phase, if no word of a vocabulary has the score 1, there is nothing stored in memory location 1. The present invention preferably requires a user to speak each word of a given vocabulary several times so that normal variations will be given different stored scores, rendering the present system more precise during a subsequent recognition phase, as will be explained. This accounts for several scores corresponding to the words "cat" or "dog" in FIG. 2.

During a subsequent recognition phase, there is no comparison necessary of the contents in each memory location, as was the case with the prior art. If a user is to speak the word "cat," the system of the present invention will quantify the word during recognition by the score 2 or 3. Accordingly, the present invention is less likely to erroneously recognize a word.

If, upon recognition, no match occurs, the system will perform a linear search, as discussed hereinafter in connection with FIG. 5B, for the closest match in score and query the user as to whether the word has been properly recognized. If the query is affirmative, the score will be assigned as an address and the data will be the same. Thus, in such a situation, the word "cat" may occupy three or more memory locations. In this respect, the recognition scheme of the present invention is "smart" in that it adapts to recognize changes in spoken words as they occur from time to time. The significant aspect of this process is that it is not necessary to compare a spoken word with the contents of each and every memory location. Since the scores of each word correspond directly with the addresses, comparisons are made on the basis of addresses.

FIG. 3 is a block diagram of a system for carrying out the method of the present invention. A microphone is connected at input terminal 10 and, as words are spoken, they undergo voice digitization in analog-to-digital converter 12. The output from the converter is input to a time compressor 14 which has, as its primary purpose, the function of compressing all digitized spoken words to the same length thereby minimizing the number of bits required for processing each word. The analog-to-digital converter and time compressor (12, 14) are conventional components incorporated by the Inter Data Corp. in equipment it manufactures and which is known in the industry as a VOTERM. Similarly, this type of technique for time-compressing digitized voice signals is shown in U.S. Pat. No. 3,755,627.

The significant departure from the prior art occurs at the output of the time compressor 14, wherein the compressed signal for each particular word forms a digital quantity or score which is connected, via line 16, to a main memory 18. Each score is in itself an address of the main memory 18; and accordingly, each spoken word has a corresponding unique address in main memory 18.

FIG. 5A illustrates a basic flow chart for the initializing phase of the inventive method. In order to initialize the system as shown in FIG. 3, a series of words, constituting a preset vocabulary, is input to the system at microphone terminal 10. After conversion and time compression, digital scores for each of the sequentially read words are formed and they form corresponding addresses in main memory 18. The data stored in each of these addresses will correspond to the position of the word in the vocabulary as shown in FIG. 4. Otherwise stated, the data for each address will contain the position of the word spoken in the sequentially read set of words constituting a vocabulary.

In order to establish the actual words corresponding with the vocabulary positions, a separate vocabulary memory 20 (FIG. 3) is employed to communicate with main memory 18 via a conventional serial communications port 19. A conventional terminal 22 is connected to the port 19 for enabling communication between terminal and memories.

In FIG. 4 the relationship between the vocabulary memory and the main memory is indicated. In the vocabulary memory the addresses correspond to the vocabulary positions of the words spoken. Since the vocabulary is sequentially read in a preset manner, the words are established before utilizing the present invention; and therefore, the data may be pre-entered into the vocabulary memory 20. Thus, by way of example, if the first word spoken is the word "dog," the vocabulary position is the first word; and the score for the word "dog" may be a digital value 6. The score for the word "dog" is multivalued, consistent with the example shown in FIG. 2, which was previously explained. Once all of the words in the vocabulary have been read into the system during the initializing phase, the recognition phase, as shown in FIG. 5B, may be employed to actually use the inventive method.

Referring to FIG. 5B, each spoken word is introduced, during a recognition phase, to the system of FIG. 3 at terminal 10 so as to undergo processing by analog-to-digital converter 12 and time compressor 14. The score obtained on line 16 immediately addresses main memory 18; and as indicated in the flow diagram of FIG. 5B, the contents of each address is the vocabulary position of such a word, as previously scored during the initializing phase. The vocabulary memory 20 may then be indirectly addressed and the data from the vocabulary memory will actually contain the word corresponding to a word input to the system shown in FIG. 3 during the recognition phase.

If an unrecognized score occurs, the recognition phase performs a bidirectional linear search of the main memory, as shown in FIG. 5B wherein the non-null contents of the closest score address in the main memory is read out and a query is made on terminal 22 (FIG. 3) of the user to determine whether the word corresponding with the closest searched score address is the correct word. If it is, the score of this word is added to the main memory and its future recognition will be automatic. Otherwise, if it is not the correct word, the user enters the vocabulary position of his word at terminal 22 and in the future it will be recognized. Accordingly, the present invention constitutes a "smart" voice recognition system which is capable of continually adapting its recognition capabilities to actual usage.

As a further refinement for the present invention, if a word is not recognized as the result of a limited bidirection search, terminal 22 may request a manual entry of the actual word itself; and from that point on, the score for the newly spoken word will correspond to the unfamiliar word.

It should be understood that the invention is not limited to the exact details of construction shown and described herein, for obvious modifications will occur to persons skilled in the art.

I claim:

1. A voice recognition method comprising:
   (a) an initializing phase including the steps:
   converting a preset vocabulary list of spoken words to digitized form;
   performing time compression of the digitized words to standardize the length of each word wherein the compressed word has a corresponding digital score;
   formatting a main memory with addresses directly corresponding to each score, the data at each address being the position of the respective word in the vocabulary; and
   (b) wherein the recognition phase includes the steps:
   converting a spoken word to a digitized form;
   performing time compression of the digitized word to standardize the length of each word wherein each compressed word has a corresponding digital score;
   addressing the main memory at the location directly corresponding to the score;
   reading out, from main memory, the position of the word in the vocabulary;
   addressing a vocabulary memory at a memory location corresponding to the position of the word in the vocabulary; and
   reading out a word stored at the vocabulary memory location, corresponding to the word spoken during the recognition phase.

2. The method set forth in claim 1 together with the initializing phase step of speaking the words of the vocabulary more than once to establish separate scores for variations of the same word.

3. The method set forth in claim 2 wherein additional addresses of the main memory directly correspond to the scores of the variations, the data at each additional address corresponding to the position of a respective word in the vocabulary.

4. The method set forth in claim 2 wherein a previously unscored word occurring after time compression in the recognition phase undergoes recognition during the steps including:
   performing a bidirectional linear search of the main memory to find the word having the closest score to that of the unscored word;
   querying a user as to whether the unscored word has been correctly searched and, if not;
   identifying the vocabulary position of the unscored word; and
   storing the vocabulary position of the word at the score address.

5. In a voice recognition method wherein a main memory has addresses directly corresponding to digital values of spoken words, the contents at each address corresponding to the position of the word in a vocabulary, recognition including the steps:
   converting a spoken word to a digitized form;
   performing time compression of the digitized word to standardize the length of each word wherein each compressed word has a corresponding digital score;
   addressing the main memory at the location directly corresponding to the score;
   reading out, from main memory, the position of the word in the vocabulary;
   addressing a vocabulary memory at a memory location corresponding to the position of the word in vocabulary; and
   reading out a word stored at the vocabulary memory location, corresponding to the word spoken during the recognition phase.

6. The method set forth in claim 5 wherein a previously unscored word occurring after time compression in the recognition phase undergoes recognition during the steps including:
   performing a bidirectional linear search of the main memory to find the word having the closest score to that of the unscored word;
   querying a user as to whether the unscored word has been correctly searched and, if not;
   identifying the vocabulary position of the unscored word; and
   storing the vocabulary position of the word at the score address.

7. A voice recognition system comprising:
   an analog-to-digital converting means for digitizing spoken words during initializing and recognition phases;
   means for time compressing the digital words during the initializing and recognition phases thereby representing digital scores for the words;
   main memory means connected to the output of the time-compressing means for storing the vocabulary position of each word spoken during an initializing phase at the address directly corresponding to the score of the word; and
   vocabulary memory means storing the vocabulary words at addresses corresponding to the position of the word in the vocabulary;
   wherein the score of each word spoken during a recognition phase directly addresses the main memory to derive the vocabulary position of the spoken word thus enabling the vocabulary memory to be indirectly addressed for reading out the recognized word.

8. The structure set forth in claim 7 together with a communicating port connected between the main and vocabulary memories to allow indirect addressing of the vocabulary memory during a recognition phase for retrieval of each recognized word.

9. The structure set forth in claim 7 together with terminal means connected in circuit to the memories for allowing entry in the system of the vocabulary position of a word unrecognized during a recognition phase; and
   adding the score of the unrecognized word to the main memory to permit its future recognition.

10. The structure set forth in claim 9 together with a communicating port connected between the main and vocabulary memories to allow indirect addressing of the vocabulary memory during a recognition phase for retrieval of each recognized word.

* * * * *

UNITED STATES PATENT AND TRADEMARK OFFICE
CERTIFICATE OF CORRECTION

PATENT NO.  :  4,797,927
DATED       :  January 10, 1989
INVENTOR(S) :  Scott Schaire It is certified that error appears in the above-identified patent and that said Letters Patent is hereby corrected as shown below:

In the Abstract, line 2, change "work" to --word--.

Column 1, line 17, change "vocabaulary" to --vocabulary--.

Column 6, line 22, change "identifyIng" to --identifying--.

Signed and Sealed this

Fourth Day of July, 1989

Attest:

DONALD J. QUIGG

*Attesting Officer*  *Commissioner of Patents and Trademarks*